(12) United States Patent
Shaikh et al.

(10) Patent No.: US 11,754,116 B2
(45) Date of Patent: Sep. 12, 2023

(54) RETENTION CONFIGURATION FOR FACE SPLINE INTERFACE

(71) Applicant: SCHAEFFLER TECHNOLOGIES AG & CO. KG, Herzogenaurach (DE)

(72) Inventors: Shakeel Shaikh, Windsor (CA); Rajmohan Kolli, Sterling Heights, MI (US); Zheng Wang, Rochester Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/727,048

(22) Filed: Apr. 22, 2022

(65) Prior Publication Data
US 2023/0160420 A1 May 25, 2023

Related U.S. Application Data

(60) Provisional application No. 63/282,434, filed on Nov. 23, 2021.

(51) Int. Cl.
*F16C 19/18* (2006.01)
*F16C 33/60* (2006.01)
*B60B 27/00* (2006.01)

(52) U.S. Cl.
CPC ........ *F16C 19/183* (2013.01); *B60B 27/0005* (2013.01); *B60B 27/0031* (2013.01); *F16C 33/60* (2013.01); *F16C 2226/80* (2013.01); *F16C 2326/02* (2013.01)

(58) Field of Classification Search
CPC ...... F16C 19/183; F16C 19/186; F16C 33/60; F16C 2226/80; F16C 2326/02; B60B 27/0005; B60B 27/0031; B60B 2900/511
See application file for complete search history.

(56) References Cited

U.S. PATENT DOCUMENTS

2009/0097792 A1\* 4/2009 Kamikawa ............ F16C 35/063
384/448

FOREIGN PATENT DOCUMENTS

| DE | 102010051616 A1 | * | 5/2012 | ......... B60B 27/0031 |
| DE | 202016000865 U1 | * | 5/2016 | ............ B60B 27/02 |
| DE | 102019128622 B4 | * | 5/2021 | |
| DE | 102020111977 A1 | * | 11/2021 | |
| KR | 20170025426 A | * | 3/2017 | |

\* cited by examiner

*Primary Examiner* — Phillip A Johnson
(74) *Attorney, Agent, or Firm* — Volpe Koenig

(57) ABSTRACT

A wheel bearing assembly is disclosed that a bearing ring defining a first splined portion, a joint element including a second splined portion configured to matingly engage with the first splined portion, and a first retention assembly arranged radially outward from the first and second splined portions. The first retention assembly is configured to axially retain the bearing ring with the joint element.

20 Claims, 2 Drawing Sheets

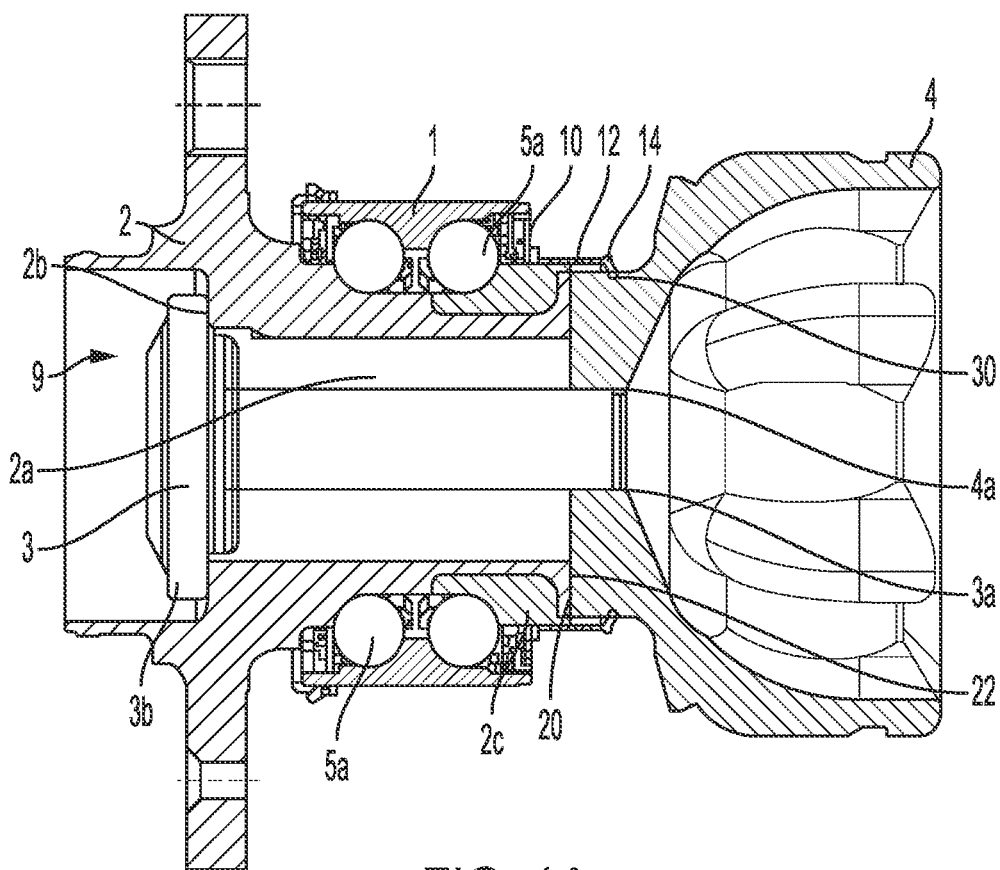
FIG. 1A
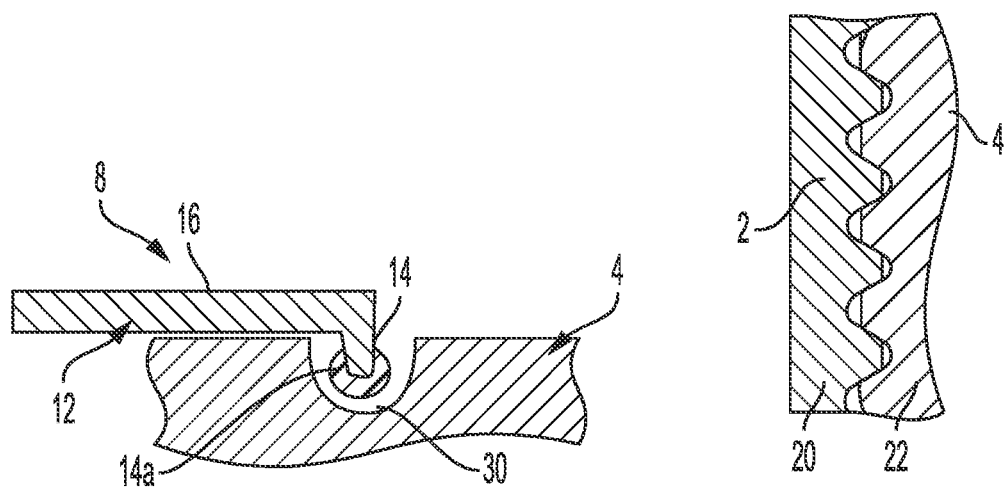
FIG. 1B
FIG. 1C

RETENTION CONFIGURATION FOR FACE SPLINE INTERFACE

INCORPORATION BY REFERENCE

This application claims priority to U.S. Provisional Application No. 63/282,434, which was filed on Nov. 23, 2021, and is incorporated herein by reference in its entirety.

FIELD OF INVENTION

The present disclosure is generally directed to wheel bearing assemblies. Specifically, the disclosure relates to a retention configuration for holding splines in engagement between a joint element and another component, such as a bearing ring.

BACKGROUND

Wheel bearing assemblies are widely used in the automotive industry. These wheel bearing assemblies typically include a bearing assembly, including inner and outer rings, rolling elements, etc., as well as a joint component or element. One such joint element is a constant velocity joint (CVJ). Splines are typically provided between end faces of the inner ring and the joint element that must remain engaged during operating or use of the wheel bearing assembly. Ensuring that these splines are engaged can be particularly difficult during assembly.

Accordingly, it would be desirable to provide a retention feature or configuration that reliably holds a bearing ring and joint element properly engaged during assembly.

SUMMARY

An improved wheel bearing assembly is disclosed herein. The wheel bearing assembly includes a bearing ring, such as an inner bearing ring, defining a first splined portion. A joint element includes a second splined portion configured to matingly engage with the first splined portion.

A first retention assembly is provided that is arranged radially outward from the first and second splined portions. The first retention assembly is configured to axially retain the bearing ring with the joint element.

The first retention assembly can comprise a sleeve that includes an axially extending arm and a retention tab. The retention tab can be over molded with a rubber tip or other sealing feature.

The joint element can further comprise a groove dimensioned to receive at least a portion of the retention tab. The groove can be formed on a radially outer surface of the joint element.

The sleeve can be configured to surround a portion of the joint element in a radial direction. The sleeve can be configured to surround an interface between the first and second splined portions. Based on this configuration, the first retention assembly does not interfere with anything inside of the bearing ring or the joint element, such as additional fastening features (i.e. interfaces for a bolt or fastener).

The sleeve can have a predetermined axial length such that the retention tab is only configured to engage the groove when the first and second splined portions are fully seated with each other. This configuration ensures that the retention tab will only snap into place within the groove in the event that the splined portions are properly aligned with each other.

A second retention assembly can also be provided that is entirely separate from the first retention assembly. The second retention assembly can include a fastener or other component configured to provide a rotationally locked connection between the inner ring and the joint element. The second retention assembly is configured to be positioned radially inward from the first and second splined portions.

The second retention assembly can comprise a fastener including a first end configured to engage an inner portion on the joint element, and a second end configured to engage an abutment surface on the inner ring.

In another aspect, a wheel bearing assembly is disclosed that includes a first retention assembly arranged radially outward from first and second splined portions on a joint element and bearing ring. The first retention assembly is configured to axially retain the bearing ring with the joint element. The wheel bearing assembly also comprises a second retention assembly arranged radially inward from the first and second splined portions.

A method of assembling a wheel bearing assembly is also disclosed herein that includes engaging a bearing ring with a joint element such that first and second splined portions matingly engage with each other, and arranging a first retention assembly radially outward from the first and second splined portions, such that the first retention assembly is configured to maintain the first and second splined portions in engagement.

Additional aspects of the disclosure are described herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 1A is a cross-section of a wheel bearing assembly.

FIG. 1B is a magnified view of a portion of the wheel bearing assembly of FIG. 1A FIG. 1C is a top view of a spline interface between a joint element and a bearing ring.

DETAILED DESCRIPTION OF THE PREFERRED EMBODIMENTS

Figure 2:
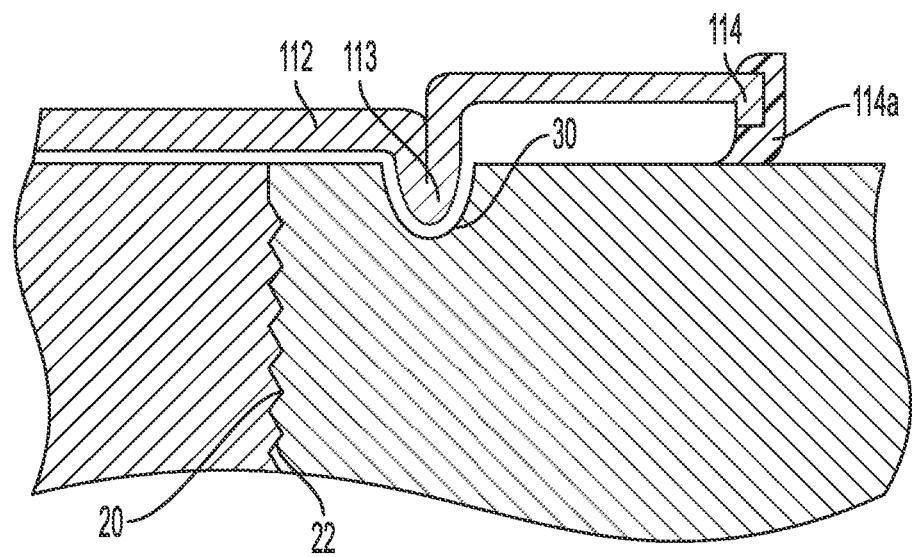
FIG. 2 is another view of a sleeve according to one aspect.

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1A illustrates a wheel bearing assembly. The wheel bearing assembly can include an outer ring 1, an inner ring 2, and two rows of rolling elements 5a, 5b arranged between the inner ring 2 and the outer ring 1. In one example, the inner ring 2 can include a secondary bearing ring 2c that defines an inner raceway for the plurality of rolling elements 5b. One of ordinary skill in the art would understand that various configurations for the bearing components can be used.

At least one of the bearing rings, such as the inner ring 2, includes a first splined portion 20. In one aspect, the first splined portion 20 can be formed as an axial face spline. The inner ring 2 can also include a through hole 2a. The through hole 2a can be dimensioned to receive at least a portion of a retention element, such as retention assembly 9 which is described in more detail herein.

The joint element 4 can comprise a second splined portion 22 that is configured to mate with or otherwise engage with the first splined portion 20. FIG. 1C illustrates the engagement between the splined portions 20, 22. As shown in FIG. 1C, in the fully seated or engaged condition, the splined portions 20, 22 are circumferentially offset from each other by half of a circumferential length of one of the splines, such that the peak of one spline engages in the valley of the other spline. This engagement between (a) a peak of a spline on a first one of the first splined portion 20 or the second splined portion 22, and (b) a valley of a spline on a second one of the first splined portion 20 or the second splined portion 22 is critical for ensuring proper functioning of the wheel bearing assembly and also ensuring that the connection or joint defined at the connection between the splined portions 20, 22 is sufficiently rigid.

A seal assembly 10 can be arranged between the outer ring 1 and the inner ring 2. In one aspect, the seal assembly 10 is a cartridge-like seal. The seal assembly 10 can be rigidly connected to either one of the rings 1, 2 and provide a sealing lip or interface with the other ring. The seal assembly 10 can generally be configured to prevent the egress of lubricant from the interior to the exterior of the bearing assembly, and/or prevent the ingress of debris or other contaminants from the exterior to the interior of the bearing assembly.

A first retention assembly 8 can be provided that includes a sleeve 12. The sleeve 12 can be formed as a cylindrical body that is configured to surround a portion of the inner ring 2c. The sleeve 12 can be press fit or otherwise secured to the inner ring 2c. One of ordinary skill in the art would understand that various securing or fastening methods could be used to attach the first retention assembly 8 to the inner ring 2c.

In one aspect, the sleeve 12 extends in an axial direction away from the rolling elements 5a, 5b and the associated rolling element raceways. The sleeve 12 can include an arm 16 and a retention tab 14. In one aspect, the arm 16 extends in an axial direction, and the retention tab 14 extends in a radial direction. The retention tab 14 can be formed on axially terminal end of the sleeve 12. The sleeve 12 can be formed from steel, in one embodiment. One of ordinary skill in the art would understand that other materials, such as other metals or hard/rigid rubbers or plastics could be used. In one embodiment, the retention tab 14 can include a sealing tip 14a. The sealing tip 14a can provide a seal that is configured to prevent the ingress of debris to the splined portions 20, 22. The sealing tip 14a can be formed as an over molded rubber tip.

The joint element 4 can include a circumferential groove 30 that is dimensioned or configured to receive the retention tab 14. The retention tab 14 is configured to be received or engaged in the groove 30. Once inside of the groove 30, the retention tab 14 ensures that the joint element 4 and the inner ring 2 cannot be axially displaced relative to one another. Therefore, the splined portions 20, 22 are retained in engagement during assembly of the inner ring 2 and the joint element 4. The retention tab 14 being engaged within the groove 30 ensures that the splines 20, 22 remain in the configuration shown in FIG. 1C prior to a final assembly step or connecting step. The retention tab 14 can extend for 360 degrees and the groove 30 can also extend for 360 degrees, such that retention is provided around an entire periphery of the wheel bearing assembly.

The sleeve 12, the arm 16, the retention tab 14, and the groove 30, collectively together, can be considered the first retention assembly 8. The first retention assembly 8 is generally configured to provide an initial retention feature between the joint element 4 and the inner ring 2 during assembly. This configuration is advantageous due to its function to maintain the splines 20, 22 in the proper alignment. The first retention assembly 8 is generally arranged radially outward from the splined portions 20, 22, in one aspect. The first retention assembly 8 can be provided via the application of an axial force or displacement to either the joint element 4 or the inner ring 2, relative to one another, and does not require any tooling or twisting/torque to be applied to either component.

The sleeve 12 can have a predetermined axial length such that the retention tab 14 is only configured to engage the groove 30 when the first and second splined portions 20, 22 are fully seated with each other (i.e. in the condition shown in FIG. 1C). If the first and second splined portions 20, 22 are not aligned to be fully engaged and seated, then the sleeve 12 will not reach axially far enough to ensure the retention tab 14 is secured in the groove 30. If the retention tab 14 is not reaching the groove 30, then the user can slightly rotate either the inner ring 2 or the joint element 4 until the splined portions 20, 22 are aligned such that full seating can occur and the retention tab 14 reaches the groove 30.

A second retention assembly 9 can also be provided. The second retention assembly 9 can generally include a fastener 3, as well as corresponding surfaces or features on the inner ring 2 and the joint element 4. In one aspect, the fastener 3 can be used to securely connect the joint element 4 with the bearing assembly, i.e. the inner ring 2. The fastener 3 can be configured to be fastened to the joint element 4 on a first end 3a, and can be configured to abut the inner ring 2 at a second end 3b. The inner ring 2 can define an abutment surface 2b for engagement with the end of the fastener 3. In one aspect, the fastener 3 can include a threading that mates with an inner portion 4a on the joint element 4 including threading. In another aspect, the fastener 3 can include an enlarged portion on the first end 3a that is configured to axially abut an inner region of the joint element 4. Various configurations can be used for securing the fastener 3 to the joint element 4. In one aspect, the fastener 3 can comprise a bolt. One of ordinary skill in the art would understand that other joining or connecting features could be used.

The first retention assembly 8 can be used during an initial step for assembling the wheal bearing assembly. A user can align the splines 20, 22 on the inner ring 2 and joint element 4 and ensure proper engagement (i.e. the splines are fully seated or mated with each other) during further handling steps based on the retention provided by the first retention assembly 8. In a subsequent step, the second retention assembly 9 can be used to provide a more permanent and secure connection between the various components of the wheel bearing assembly without further checking the engagement of the splines 20, 22.

FIG. 2 illustrates another embodiment for a sleeve 112 in which the sleeve 112 extends axially beyond the groove 30. As shown in FIG. 2, the sleeve 112 includes a medial portion 113 that is configured to protrude into the groove 30, and a terminal end of the sleeve 112 includes a sealing tab 114. The sealing tab 114 can include a sealing tip 114a, which can be formed as an over molded plastic or rubber tip, that is configured to engage against the joint element 4 to define a seal.

A method of assembling a wheel bearing assembly is disclosed herein.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG TO REFERENCE NUMERALS

Outer ring 1
Inner ring 2
Through hole 2*a*
Abutment surface 2*b*
Secondary bearing ring 2*c*
Fastener 3
First end 3*a* of fastener 3
Second end 3*b* of fastener 3
Joint element 4
Inner portion 4*a* of joint element
Rolling elements 5*a*, 5*b*
First retention assembly 8
Second retention assembly 9
Seal assembly 10
Sleeve 12, 112
Retention tab 14, 114
Sealing tip 14*a*, 114*a*
Axially extending arm 16
First splined portion 20
Second splined portion 22
Groove 30
Medial portion 113

What is claimed is:

1. A wheel bearing assembly comprising:
a bearing ring defining a first splined portion;
a joint element including a second splined portion configured to matingly engage with the first splined portion; and
a first retention assembly arranged radially outward from the first and second splined portions, wherein the first retention assembly is configured to axially retain the bearing ring with the joint element.

2. The assembly according to claim 1, wherein the first retention assembly comprises a sleeve that is fixed to the bearing ring.

3. The assembly according to claim 2, wherein the sleeve comprises an axially extending arm and a retention tab.

4. The assembly according to claim 3, wherein the sleeve is formed from steel and the retention tab is over molded with a sealing tip.

5. The assembly according to claim 3, wherein the joint element further comprises a groove dimensioned to receive at least a portion of the retention tab.

6. The assembly according to claim 5, wherein the sleeve has a predetermined axial length such that the retention tab is only configured to engage the groove when the first and second splined portions are fully seated with each other.

7. The assembly according to claim 3, wherein the sleeve is configured to surround a portion of the joint element in a radial direction.

8. The assembly according to claim 3, wherein the sleeve is configured to surround an interface between the first and second splined portions.

9. The assembly according to claim 1, further comprising a second retention assembly positioned radially inward from the first and second splined portions.

10. The assembly according to claim 9, wherein the second retention assembly comprises a fastener including a first end configured to engage an inner portion on the joint element, and a second end configured to engage an abutment surface on the bearing ring.

11. A wheel bearing assembly comprising:
a bearing ring defining a first splined portion;
a joint element including a second splined portion configured to matingly engage with the first splined portion;
a first retention assembly arranged radially outward from the first and second splined portions, the first retention assembly being configured to axially retain the bearing ring with the joint element; and
a second retention assembly arranged radially inward from the first and second splined portions.

12. The wheel bearing assembly according to claim 11, wherein the first retention assembly comprises a sleeve that is fixed to the bearing ring.

13. The assembly according to claim 12, wherein the sleeve comprises an axially extending arm and a retention tab.

14. The wheel bearing assembly according to claim 13, wherein the joint element further comprises a groove dimensioned to receive at least a portion of the retention tab.

15. The wheel bearing assembly according to claim 14, wherein the sleeve has a predetermined axial length such that the retention tab is only configured to engage the groove when the first and second splined portions are fully seated with each other.

16. The wheel bearing assembly according to claim 13, wherein the sleeve is configured to surround a portion of the joint element in a radial direction.

17. A method of assembling a wheel bearing assembly, the method comprising:
(i) providing:
a bearing ring defining a first splined portion;
a joint element including a second splined portion; and
a first retention assembly arranged radially outward from the first and second splined portions;
(ii) engaging the bearing ring with the joint element such that the first and second splined portions matingly engage with each other, wherein the first retention assembly is configured to maintain the first and second splined portions in engagement.

18. The method according to claim 17, wherein the first retention assembly comprises a sleeve fixed to the bearing ring, and a groove formed on the joint element, wherein the sleeve is dimensioned to be at least partially received within the groove.

19. The method according to claim 18, wherein the sleeve includes a retention tab on an axial end and the sleeve has a predetermined axial length such that the retention tab is only configured to engage the groove when the first and second splined portions are fully seated with each other.

20. The method according to claim 17, further comprising:
   providing a second retention assembly positioned radially inward from the first and second splined portions.

\* \* \* \* \*